United States Patent [19]

Seike et al.

[11] Patent Number: 5,029,969
[45] Date of Patent: Jul. 9, 1991

[54] OPTICAL FIBER COMPOSITE INSULATOR AND METHOD OF PRODUCING THE SAME

[75] Inventors: Shoji Seike; Toshiyuki Mima, both of Nagoya; Masayuki Nozaki, Ama; Naoki Tani; Mitsuji Ikeda, both of Nagoya, all of Japan

[73] Assignee: NGK Insulators, Ltd., Japan

[21] Appl. No.: 421,410

[22] Filed: Oct. 16, 1989

[30] Foreign Application Priority Data

Oct. 14, 1988 [JP] Japan ............................... 63-257365
Dec. 12, 1988 [JP] Japan ............................... 63-311831
Dec. 12, 1988 [JP] Japan ............................... 63-311832

[51] Int. Cl.⁵ .............................................. G02B 6/36
[52] U.S. Cl. .................................. 350/96.20; 174/139
[58] Field of Search ...................... 350/96.20; 174/139

[56] References Cited

U.S. PATENT DOCUMENTS

| | | | |
|---|---|---|---|
| 4,613,727 | 9/1986 | Salanki et al. | 174/139 |
| 4,653,846 | 3/1987 | Yamazaki et al. | 350/96.20 |
| 4,810,836 | 3/1989 | Shinoda et al. | 174/139 |
| 4,833,278 | 5/1989 | Lambeth | 174/139 |
| 4,921,322 | 5/1990 | Seike et al. | 174/139 X |

FOREIGN PATENT DOCUMENTS 63-194303 12/1988 Japan .

Primary Examiner—William L. Sikes
Assistant Examiner—Phan T. Heartney
Attorney, Agent, or Firm—Parkhurst, Wendel & Rossi

[57] ABSTRACT

An optical fiber composite insulator comprises a hollow insulator body having an axial through-hole and at least one optical fiber extended through the through-hole and hermetically sealed to the inner surface of the through-hole by a sealing material. A relationship between a condition of the inner surface of the through-hole and the sealing material, a relationship between the inner diameters of the through-hole and the outer diameter of the hollow insulator body or a coating material on the optical fiber are selected to provide high insulating property, mechanical strength and airtight property of the optical fiber composite insulator.

7 Claims, 2 Drawing Sheets

FIG_2
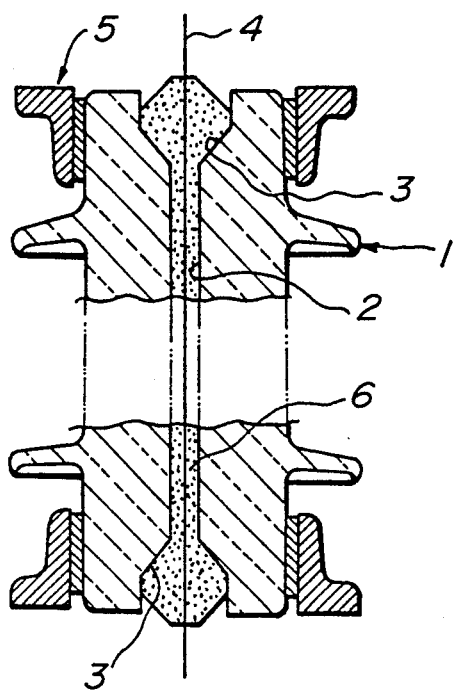
FIG_3
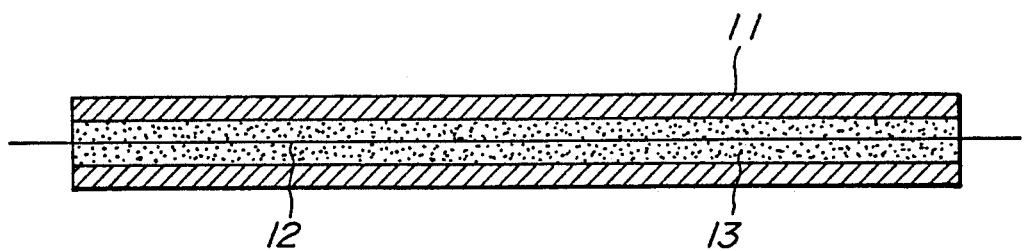
FIG.4
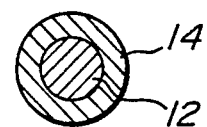

OPTICAL FIBER COMPOSITE INSULATOR AND METHOD OF PRODUCING THE SAME

BACKGROUND OF THE INVENTION

1. Field of the Invention

The present invention relates to an optical fiber composite insulator which is mainly used in the formation of a detection system for detecting fault points in electric power transmission networks, distribution systems, substations and the like, and a method of producing the optical fiber composite insulator.

2. Related Art Statement

Hitherto, it has been desired to develop a system for quickly detecting and repairing fault points caused by thunderbolts or the other in electric power transmission networks, distribution systems, substations and the like. Detection systems have been used including photosensors provided with Pockels and Faraday elements for detecting an extraordinary voltage and current.

In such a detection system, it is required to electrically insulate the photosensor from a fault point detector and a display by means of an optical fiber composite insulator.

Therefore, the optical fiber composite insulator used in the detection systems is required not only to effectively transmit optical signals from the photosensors to the detectors through at least one optical fiber but also to maintain the necessary mechanical strength and electrical insulating function nearly equal to those of the conventional solid insulator for a long useful life.

Various optical fiber composite insulators have been known. For example, Japanese Patent Application Laid-open Publication No. 60-158402 discloses a technique of hermetically sealing one or more optical fibers passed through a central through-hole in a hollow insulator body by wholly or partly filling an organic sealing material such as silicone rubber within the clearance between the optical fiber or fibers and the inner surface of the central through-hole to thereby prevent the decrease of the surface leakage insulating distance, and also discloses a technique of sealing the optical fibers by wholly filling an inorganic sealing material such as a melted glass within the clearance in the central through-hole in the hollow insulator body after the entire insulator is previously heated.

Furthermore, there has been known a technique of hermetically sealing the optical fibers by partly filling an organic insulating material such as silicone rubber within only the axially intermediate portion of the clearance in the central through-hole and sealing the optical fibers within remaining clearances in the opposite end portions of the through-hole by melted glass.

The conventional optical fiber composite insulators hermetically sealed by using the organic material such as silicone rubber as a sealing material for maintaining the necessary airtightness between the optical fiber and the inner surface of the through-hole in the hollow insulator body can be easily produced since a heat treatment at high temperature is not required in an optical fiber sealing process after producing the insulator bodies. However, the optical fiber composite insulators are usually exposed to severe conditions of temperature and humidity such that the surface temperature is raised to about 60° C. by absorbing a heat from the sun in midsummer and is conversely lowered to about −20° C. cooling in midwinter, and are continuously loaded with an electric power. Thus, the weather resistance of the sealing material is too deteriorated to effectively use the optical fiber composite insulators in the detection systems if the sealing materials are not adequately selected. Also, adhesion interfaces between the silicone rubber or glass and the optical fibers and between the inner surface of the through-hole of the hollow insulator body and the silicone rubber or glass should keep the necessary airtightness even if the optical fiber composite insulator is exposed to a variation of circumferential temperature, humidity and the other for a long term. However, a relationship between the inner surface of the through-hole and the organic or inorganic sealing materials for satisfactorily sealing the optical fiber under such a condition has not been considered.

Furthermore, the conventional optical fiber composite insulators comprising a hollow insulator body have a mechanical strength lower than that of the conventional solid insulators of the same outer diameter. Moreover, the optical fiber composite insulator comprises the hollow insulator body having the central through-hole filled with a cured material having a different coefficient of thermal expansion and, as a result, the mechanical strength is further decreased by a residual stress.

Also, the optical fiber composite insulator must have the same mechanical strength as that of the conventional solid supporting insulator, since it is required to be interchangeable with the conventional solid supporting insulator usually used in disconnectors. However, the conventional optical fiber composite insulator has not been elucidated about a relationship between the inner diameter of the through-hole and the outer diameter of the barrel portion of the hollow insulator body and an effect of the sealing material filled in the through-hole on the mechanical strength of the optical fiber composite insulator.

SUMMARY OF THE INVENTION

It is an object of the present invention to eliminate the aforementioned problems and drawbacks and to provide an optical fiber composite insulator having the same electrical insulating property as that of the conventional solid insulator of the same geometric configuration and outer dimensions by providing a relationship between a condition of the inner surface of the through-hole and the sealing material.

Another object of the present invention is to provide an optical fiber composite insulator having the same mechanical strength as that of the conventional solid insulator of the same geometric configuration and outer dimensions by providing a relationship between the inner diameter "d" of the through-hole and the outer diameter "D" of the hollow insulator body.

It is a further object of the present invention to eliminate the aforementioned problems and drawbacks and to provide an optical fiber composite insulator having an excellent airtight property of long life by use of organic sealing materials, and provide a method of producing the optical fiber composite insulator.

The first aspect of the present invention lies in an optical fiber composite insulator comprising a hollow insulator body having an axial through-hole and at least one optical fiber extended through the through-hole and hermetically sealed to the inner surface of the through-hole by means of a sealing material, the sealing material being an organic sealing material and the inner surface of the through-hole being a glazed surface which is applied with a glaze and fired.

The second aspect of the present invention lies in an optical fiber composite insulator comprising a hollow insulator body having an axial through-hole and at least one optical fiber extended through the through-hole and hermetically sealed to the inner surface of the through-hole by means of a sealing material, the sealing material being an inorganic sealing material, and the inner surface of the through-hole being an unglazed surface on which any glaze is not applied and fired or a polished surface.

It is found from results of experiments as described after that when the optical fiber is hermetically sealed to the glazed surface of the through-hole in the hollow insulator body by use of the organic sealing material such as a silicone rubber or the like, the bonding strength is increased, thereby maintaining the excellent hermetical property for a long life. Also, when the optical fiber is hermetically sealed to the unglazed surface or polished surface of the through-hole in the hollow insulating body by use of the inorganic sealing materials such as a glass or the like, the hermetical property is improved.

It will be seen from the above that the inner surface of the through-hole in the hollow insulator body should be adapted to the particular sealing material so as to provide an optimum sealing condition for the particular sealing material to thereby improve the hermetic property of the sealed portion, resulting in a fault detection system with optical fiber composite insulators having a high hermetical reliability and an excellent electrical insulating property for electric power transmission networks, substations or the like.

The third aspect of the present invention lies in an optical fiber composite insulator comprising a hollow insulator body having an axial through-hole and at least one optical fiber extended through the through-hole and hermetically sealed to the inner surface of the through-hole by means of a sealing material, a ratio d/D of the inner diameter "d" of the through-hole of the hollow insulator body to the outer diameter "D" of the hollow insulator being at most 0.25. It is found from results of experiments as described after that according to the third aspect of the present invention, a mechanical strength of the optical fiber composite insulator can be increased to substantially the same mechanical strength as that of the conventional solid insulator having the same geometrical configuration and outer dimensions.

The optical fiber composite insulator according to the third aspect of the present invention is usable in place of the conventional solid insulator used for disconnectors in the distribution system so that the fault detection system will be easily arranged in the existing distribution system.

If the ratio d/D exceeds 0.25, the mechanical strength and the critical value of thermal resistance of the optical fiber composite insulator becomes lower than that of the conventional solid insulator having the same geometrical configuration and the outer dimensions.

It is preferable that the inner diameter "d" of the through-hole is at least 3 mm in order to pass the optical fiber or fibers therethrough and keep a satisfactory airtightness after the sealing.

The fourth aspect of the present invention lies in an optical fiber composite insulator composed of a hollow insulator body having an axial through-hole, at least one optical fiber extended through the through-hole, and hermetically sealed to the inner surface of the through-hole, a coated portion of the optical fiber being hermetically sealed to the inner surface of the through-hole by means of an organic sealing material such as silicone rubber, the coated portion of the optical fiber including a shock buffer layer of a resin of a Young's modulus of at least 10 kg/mm$^2$ and a tensile strength of at least 300 kg/cm$^2$.

It is preferable that the organic sealing material is silicone rubber having material properties such that an elongation at breakdown is at least 300% and a tensile strength is at least 30 kg/cm$^2$.

The fifth aspect of the present invention lies in a method of producing the optical fiber composite insulator comprising steps of passing at least one optical fiber through a through-hole formed in a hollow insulator body and hermetically sealing the optical fiber in the through-hole by a sealing material. According to the invention, a portion of the optical fiber to be sealed in the through-hole is coated by use of a resin of a Young's modulus of at least 10 kg/mm$^2$ and a tensile strength of at least 300 kg/cm$^2$, and a primer treatment is applied to the coated portion. A silicone rubber is filled in a clearance between the coated portion of the optical fiber and the inner surface of the through-hole and is cured at a temperature not lower than 60° C. to hermetically seal the optical fiber and the inner surface of the hollow insulator body.

The particular combination of the coating material and organic sealing material according to the fifth aspect of the present invention makes it possible to provide an optical fiber composite insulator of organic sealed type having a high resistance to an environmental stress such as a temperature change of the environment using the composite insulator and also having a property for maintaining the airtightness for a long period.

BRIEF DESCRIPTION OF THE DRAWINGS

FIG. 2 is a schematic sectional view of an embodiment of the optical fiber composite insulator according to the present invention;

FIG. 3 is a sectional view of a test piece; and

FIG. 4 is an enlarged cross-sectional view of an optical fiber.

DESCRIPTION OF THE PREFERRED EMBODIMENTS

Figure 1:
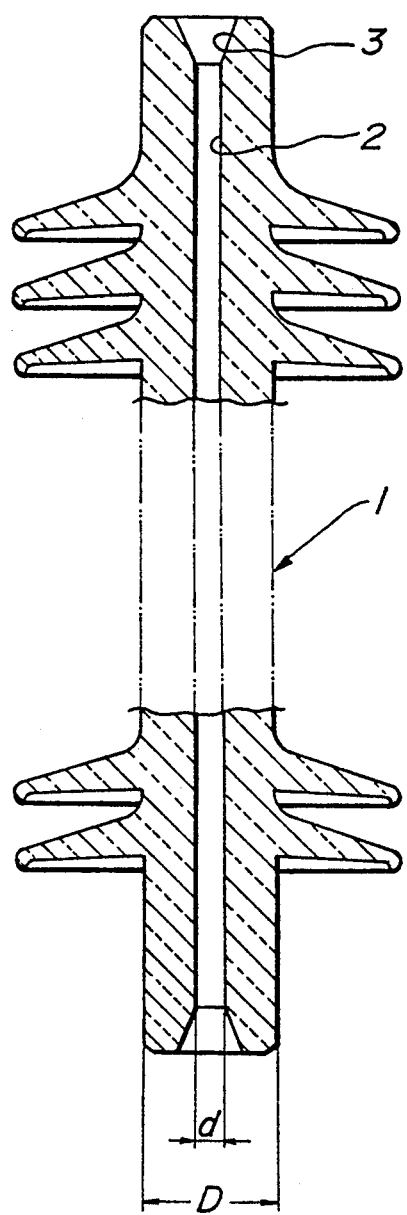
FIG. 1 is a schematic sectional view of a hollow insulator body of the optical fiber composite insulator according to the present invention.

The present invention will hereinafter be explained in more detail referring to the accompanying drawings.

EXAMPLE 1

Now will be described an example using the organic material as the sealing material.

Various kinds of ceramic hollow insulator bodies 1 each having a central through-hole 2 as shown in FIG. 1 were prepared. The material of these hollow insulator bodies was the same as that of a conventional solid insulator used as a support for a disconnector in the substations. Each hollow insulator body had an outer diameter of 105 mm and a length of 1,000 mm. Three kinds of hollow insulator bodies having different central through-holes of the inner diameter of 6, 8 and 10 mm were prepared. The central through-hole 2 was provided at each of the opposite ends with an opening having a larger inner diameter than the through-hole 2 by 10 mm and a tapered portion 3 of an angle of 30° to the axis so as to relieve an internal pressure generated by a variation in the circumferential temperature.

For effecting tests, two kinds of hollow ceramic insulator bodies were prepared. One had an unglazed inner surface and another had a glazed inner surface applied with the same glaze as that of the outer surface of the insulator body (glazed surface; glazes of two colors). It should be noted that the inner surface of the central through-hole of the hollow insulator body was usually unglazed since it was difficult to apply the glaze to the inner surface.

These hollow insulator bodies were provided with optical fibers passed through the through-hole of the hollow insulator bodies and sealed by a silicone rubber to produce optical fiber composite insulators. Thus prepared optical fiber composite insulators were used as test samples. The optical fibers used in these test samples were coated with a primary coat and a shock absorbing layer by considering the airtight property of the optical fiber itself and the handling property of the optical fiber in the sealing process. Moreover, in order to ensure a necessary hermetical bonding property of the surface of the shock absorbing layer which is the most outer layer of the coated portion on the optical fiber, a primer treatment was applied to the surface of the shock absorbing layer by use of a silane coupling agent.

Also, among various silicone rubbers of addition type having a high temperature curing property, a silicone rubber having a high tensile strength and elongation at breakdown were selected as sealing materials. Properties of the shock absorbing layer coated on the optical fiber and the silicone rubber used as the sealing material are shown in Table 1.

TABLE 1

|  | Coated portion of optical fiber | Silicone rubber |
|---|---|---|
| Tensile strength (kg/cm²) | 450 | 45 |
| Elongation at breakdown (%) | 47 | 570 |
| Hardness | (Shore hardness D) 54 | (JIS) 34 |
| Material | epoxy series acrylic resin | addition reaction type silicone rubber |

Each test sample had two optical fibers passed through the through-hole in the ceramic hollow insulator body and under a condition that each optical fiber was subjected to a tension of 1 kg, silicone rubber was filled into the clearance between the optical fibers and the inner wall of the through-hole. The silicone rubber was agitated for 30 min in a vacuum of at most 1 Torr to remove bubbles and then filled into the clearance under pressure of 5 kg/cm². When the silicone rubber was filled under pressure, it was preferable to apply a vacuum to the end of the through-hole opposite to the filling end to thereby prevent bubbles from remaining in the adhesion interfaces between the silicone rubber and the optical fibers, and between the surface of the through-hole and the silicone rubber. The insulator body was filled with the silicone rubber and then kept in a thermostatic chamber of 80° C. for 6 hours to cure the silicone rubber to thereby finally produce optical fiber composite insulators as test samples.

Thus produced optical fiber composite insulators were tested by the thermal resistance critical test, thermal shock test and AC withstand voltage test after heating cycle treatment, respectively.

In the thermal shock test, ten test samples were prepared. The test was effected by alternately immersing the sample five times over in a hot water tank of 90° C. and a cold water tank of ° C. for 30 minutes, respectively. The crack formation in the test samples was investigated after testing. The results of the observation are expressed in Table 2 by a symbol ⊚ when any crack did not occur in all ten test samples and a symbol X when cracks occurred in the test samples.

In the thermal resistance critical test, ten test samples were prepared. These test samples were heated to a predetermined temperature at a rate of 30° C./hr and subsequently kept at the temperature for 3 hours. Then the appearance of the test samples was observed after cooling. The results of the test are expressed in Table 2 by a symbol ⊚ when any crack did not occur all ten test samples, a symbol Δ when cracks apparently occurred, the silicone rubber protruded or the optical transmission factor varied in 1/10 of test samples and a symbol X when such a detractive change occurred in at least 2/10 of test samples. The above tests were carried out at a temperature of 80° C. at the first stage and then undetracted test samples were sequentially tested at 90° C., 100° C., 110° C. and 120° C. In the heat cycle test, ten test samples were prepared and tested by alternately immersing in a thermostatic bath of 90° and a thermostatic bath of −20° C. for three hours, respectively. At each of heat cycles of 500, 1,000, 1,500, 2,000 and 3,000 cycles, the appearance, crack observation and AC withstand voltage tests were effected. The results of the tests are expressed in Table 2 by a symbol ⊚ when any fault did not occur, a symbol Δ when an electric current penetrated through 1/10 of test samples and a symbol X when an electric current penetrated through at least 2/10 of test samples.

TABLE 2

| Test No. | Through-hole Diameter (mm) | Glaze | Thermal shock test | Thermal resistance critical test (°C.) 80 | 90 | 100 | 110 | 120 | Heat cycle test (cycle) 500 | 1,000 | 1,500 | 2,000 | 2,500 | 3,000 | Remarks |
|---|---|---|---|---|---|---|---|---|---|---|---|---|---|---|---|
| 1 | 6 | A | ⊚ | ⊚ | ⊚ | ⊚ | ⊚ | ⊚ | ⊚ | ⊚ | ⊚ | ⊚ | ⊚ | ⊚ | Present |
| 2 | 6 | B | ⊚ | ⊚ | ⊚ | ⊚ | ⊚ | ⊚ | ⊚ | ⊚ | ⊚ | ⊚ | ⊚ | ⊚ | invention |
| 3 | 8 | A | ⊚ | ⊚ | ⊚ | ⊚ | ⊚ | ⊚ | ⊚ | ⊚ | ⊚ | ⊚ | ⊚ | ⊚ |  |
| 4 | 8 | B | ⊚ | ⊚ | ⊚ | ⊚ | ⊚ | ⊚ | ⊚ | ⊚ | ⊚ | ⊚ | ⊚ | ⊚ |  |
| 5 | 10 | A | ⊚ | ⊚ | ⊚ | ⊚ | ⊚ | ⊚ | ⊚ | ⊚ | ⊚ | ⊚ | ⊚ | Δ |  |
| 6 | 10 | B | ⊚ | ⊚ | ⊚ | ⊚ | ⊚ | ⊚ | ⊚ | ⊚ | ⊚ | ⊚ | ⊚ | Δ |  |
| 7 | 6 | non | ⊚ | ⊚ | ⊚ | ⊚ | ⊚ | Δ | ⊚ | ⊚ | ⊚ | Δ | X | X | Comparative |
| 8 | 8 | non | ⊚ | ⊚ | ⊚ | ⊚ | Δ | X | ⊚ | ⊚ | ⊚ | X | X | X | ative |

TABLE 2-continued

| Test No. | Through-hole Diameter (mm) | Glaze | Thermal shock test | Thermal resistance critical test (°C.) 80 | 90 | 100 | 110 | 120 | Heat cycle test (cycle) 500 | 1,000 | 1,500 | 2,000 | 2,500 | 3,000 | Remarks |
| --- | --- | --- | --- | --- | --- | --- | --- | --- | --- | --- | --- | --- | --- | --- | --- |
| 9 | 10 | non | ⊚ | ⊚ | ⊚ | ⊙ | X | X | ⊚ | ⊙ | Δ | X | X | X | example |

Note:
Glaze A is white glaze and glaze B is brown glaze, both glazes are usually used in conventional solid suspension insulators.

It is appreciated from the results in Table 2 that the test samples having the glazed inner surface or unglazed inner surface in the through-hole exhibited good results in the thermal shock test, but different results in the thermal resistance critical test and heat cycle test. That is, in the thermal resistance critical test, the test samples of the optical fiber composite insulator having the glazed inner surfaces applied with the glazes A or B, are no problem up to 120° C. independent of the inner diameter of the through-hole, but the test samples having the unglazed inner surface exhibited a decreasing of the thermal resistance critical temperature with the increasing of the inner diameter of the through-hole. This reason is that the difference of the coefficient of thermal expansion between the silicone rubber and the ceramics of the hollow insulator body is large to generate an internal pressure in the through-hole of the hollow insulator body owing to the expansion of the silicone rubber at the time of the thermal resistance critical test. As a result, the hollow insulator was destructed.

Also, it is seen from the results of the heat cycle test that the test samples having the glazed inner surfaces applied with the glazes A and B exhibited no crack formation and no decreasing of AC withstand voltage up to 2,500 cycles, resulting in good test results. The test samples having unglazed inner surfaces of the through-holes, exhibited a decreasing of the AC withstand voltage at 1,500 cycles~2,000 cycles owing to separation of the adhered portion. It is appreciated from a result of an investigation effected on decomposed optical fiber composite insulators after being subjected to the same number of heat cycles as those of samples destructed at the AC withstand voltage test that there is a separation in the bonding interface between the inner surface of the through-hole and the silicone rubber and the separation progresses with an increase of the number of heat cycles.

Moreover, bonding strength tests were effected by use of test pieces which had a diameter of 40 mm and a height of 10 mm and were made of the same ceramics as used in the optical fiber composite insulator. Surfaces of some test pieces to be bonded by silicone rubber were glazed (glaze color two level) and surfaces of remaining test pieces to be bonded by silicone rubber were unglazed. The test pieces were produced in such a manner that two sheets of ceramic material were ground to the given shape after firing and bonded by silicone rubber. The silicone rubber was prepared by the same manner as the process of the optical fiber composite insulator, and was cured at 80° C. for 1 hour. In the bonding strength test, twenty test pieces taken from a cured batch of the same composition and curing condition were prepared. These test pieces were stretched at a rate of 25 mm/min by a tensile testing machine. The bonding strength was calculated by dividing a tensile load at breakdown of the silicone rubber in the bonding portion by a bonding sectional area. The mode of the breakdown is a separation of the silicone rubber from the surface of the test piece and a tensile rupture of the silicone rubber itself.

A rate of cohesion fracture is expressed by the numbers of tensile ruptures of the silicone rubber for all test pieces by percent. The results of the test are shown in Table 3.

TABLE 3

| Test No. | Glaze condition | Bonding strength (kg/cm$^2$) | Rate of cohesion fracture (%) |
| --- | --- | --- | --- |
| 10 | A | 42 | 100 |
| 11 | B | 40 | 100 |
| 12 | non | 25 | 0 |

Note:
Glaze A is white glaze and glaze B is brown glaze. Both are used for glazing the surface of an insulator.

It is appreciated from the results of the bonding strength test shown in Table 3, the test pieces having a glazed surface had a high bonding strength and a breakdown mode was a cohesion fracture dependent upon the tensile strength of the silicone rubber itself. Further, the bonding interface was strong. Moreover, the bonding of the glazed surface and silicone rubber provided a high bonding strength and a high hermetical sealing property.

EXAMPLE 2

In this example, an inorganic material was used. Various kinds of ceramic hollow insulator bodies 1 each having a central through-hole 2 as shown in FIG. 1 were prepared. The material of these hollow insulator bodies was the same as that of a conventional solid insulator used as a support of a disconnector in the substations. Each hollow insulator body had an outer diameter of 105 mm and a length of 1,000 mm. The through-hole had an inner diameter of 6 mm. Also, both ends of the through-hole had tapered openings of a taper angle of 5° having a length of 50 mm in the axial direction of the hollow insulator body.

The inner surface of the through-hole was surface glazed by use of a white glaze which is used on the outer surface of the conventional solid insulator body or unglazed surface. Alternatively, the inner surface of the through-hole was polished after firing.

The optical fiber was a silica glass series fiber having a core diameter of 80 μm and a clad diameter of 125 μm. The optical fiber coated by a primary coat and a shock absorbing layer was used by considering the airtight property of the optical fiber itself and the handling property. In order to effect the hermetical sealing between the sealing glass and the optical fiber and prevent the sealing glass from foaming by combustion of an organic material in the coated portion of the optical fiber at high temperature of the melted glass, the coated portion having a length of 35 mm was mechanically removed by means of a jacket stripper after immersing in ethanol.

A cylinder having a tapered outer surface of the same taper angle of 5° as that of the end opening of the through-hole in the hollow insulator body and a through-hole at the bottom thereof for passing the optical fiber or fibers therethrough was made of Koval. The outer surface of the cylinder was coated with a glass and previously cleaned and degreased by an acid treatment by use of a solution of $FeCl_3$. Also, an oxidized treatment was effected so as to improve the wettability with the glass and completely effect a bonding reaction with the melted glass. The oxidized treatment was carried out at 800° C. for 20 minutes in air. The outer peripheral portion of the cylinder made of Koval was covered with glass of a thickness of about 1 mm by means of a spray.

Subsequently, the covering glass on the cylinder was dried at 80° C. for 30 minutes and then calcinated at 320° C. for 1 hour in an electric furnace. Thus, a glass coated cylinder was set in the opening end portion of the through-hole in the hollow insulator body. As the glass, a lead borate series glass having a low melting point and a low coefficient of thermal expansion was used.

Furthermore, a calcinated glass body had a length of 35 mm and a tapered outer surface of the same taper angle and diameter as those of the inner surface of the cylinder. The glass body further had a through-hole for passing the optical fiber therethrough. The calcinated glass body was set within the cylinder with the through-hole of the glass body being aligned with the through-hole of the cylinder. The calcinated glass body was prepared by press forming a lead borate series glass added with a small amount of methylcellulose (MC) organic binder with conditioning water and shaping the outer peripheral portion and the through-hole, subsequently heating at a rate of 50° C./hr and keeping at 320° C. for one hour.

The optical fiber was passed through the through-hole of the hollow insulator body and the through-hole in the Koval cylinder and the calcinated glass body.

Then the insulator was set within a copper coil having seven windings which was applied with a high frequency voltage by means of a high frequency conductive voltage generator. The cylinder made of Koval was heated by the high frequency voltage. The high frequency voltage and current was set to heat the cylinder to 500° C.

Consequently, the cylinder was heated to 500° C. in about 20 minutes after applying the high frequency voltage. The cylinder was kept at 500° C. for about 10 minutes. In the mean time, the upper end of the cylinder was pressed by a load of 20 kg to hermetically seal the peripheral portion of the cylinder and the end opening. Subsequently, the cylinder was naturally cooled.

Furthermore, in order to protect the coated portion of the glass fiber extended from the glass sealed portion at the opening of the through-hole in the insulator, a silicone rubber which was degassed in a vacuum was filled and cured at 80° C. for one hour. The aforementioned series of the producing process was effected such that after the sealing and coated portion reinforcing process were finished at one end of the insulator, the insulator was turned over and then the other end was sealed and reinforced. Finally, flanged caps were fixed by a cement to finish the optical fiber composite insulator. The materials of the ceramic hollow insulator bodies and the sealing glass used in this example are shown in Table 4.

TABLE 4

|  | Insulator | Glass A | Glass B |
|---|---|---|---|
| Coefficient of thermal expansion ($\times 10^{-7}$/°C.) | 74 | 42 | 58 |
| Melting temperature (°C.) | — | 420 | 450 |
| Main compositions | $SiO_2$, $Al_2O_3$ | PbO, $TiO_2$ $B_2O_3$ | PbO, $SiO_2$ $B_2O_3$, $Li_2O$ |

The optical fiber composite insulators produced in this example were tested by the thermal resistance critical test, the thermal shock test and the AC withstand voltage test after heat cycle in the same manner as in the Example i. It is noted that the thermal resistance critical test was started from 120° C., and Subsequently effected at 130° C., 140° C. and 150° C. on the undetracted test samples. The heat cycle test was effected at 2,000 3,000 and 5,000 cycles. The results of the above test are shown in Table 5.

TABLE 5

| | | | | Test items | | | | | | | |
|---|---|---|---|---|---|---|---|---|---|---|---|
| Test No. | Surface of through-hole | Glaze | Thermal shock test | Thermal resistance critical test (°C.) | | | | Heat cycle test (cycle) | | | | Remarks |
| | | | | 120 | 130 | 140 | 150 | 2,000 | 3,000 | 4,000 | 5,000 | |
| 13 | Unglazed surface | A | ⊚ | ⊚ | ⊚ | ⊚ | ⊚ | ⊚ | ⊚ | ⊚ | ⊙ | Present |
| 14 | | B | ⊚ | ⊚ | ⊚ | ⊚ | ⊚ | ⊚ | ⊚ | ⊚ | ⊙ | invention |
| 15 | Ground surface | A | ⊚ | ⊚ | ⊚ | ⊚ | ⊚ | ⊚ | ⊚ | ⊚ | ⊙ | |
| 16 | | B | ⊚ | ⊚ | ⊚ | ⊚ | ⊚ | ⊚ | ⊚ | ⊚ | ⊙ | |
| 17 | Glazed surface | A | Δ | ⊚ | ⊚ | Δ | X | ⊚ | ⊚ | Δ | X | Comparative example |
| 18 | (white glaze) | B | X | ⊚ | ⊚ | Δ | X | ⊚ | ⊚ | X | X | |

Note:
White glaze is the same as that used in conventional solid suspension insulator The following matters were confirmed from the results as shown in Table 5. As to the thermal shock tests, the unglazed and ground inner surface of the through-hole were not fractured and provided good results. The glazed surface was cracked at portions between the glass and the inner surface of the through-hole. In the thermal resistance critical test, the optical fiber composite insulators having the unglazed and ground inner surface had no problem until 150° C., but the optical fiber composite insulators having the glazed inner surface were partially cracked at 140° C. In the heat cycle test, the optical fiber composite insulators having the unglazed and ground inner surface could resist up to 5,000 cycles to provide good results, while the optical fiber composite insulators having the glazed inner surface could not resist over 3,000 cycles. It is found from a result of investigation of decomposed optical fiber composite insulators subjected to the same heat cycles as that of the insulator destructed at a low AC withstand voltage that the sealed portions between the glass and the inner surface of the through-hole were cracked and water entered cavity portions at the intermediate portion of the through-hole.

Moreover, the bonding strengths were tested by use of test pieces. The test pieces having a diameter of 20 mm and a height of 10 mm were made of the same ceramic material as used for the optical fiber composite insulator. These kinds of test pieces having unglazed, ground and glazed inner bonding surfaces, respectively, were prepared. These test pieces were fired and then ground to provide ends of the predetermined shape and after a glass was applied to the bonding surface by means of a spray, were calcinated at 350° C. for one hour. The glass applied surface of the two test pieces were closely contacted and fired at 500° C. for 1 hour to bond integrally two test pieces. The bonding strength test was effected on twenty test pieces for each level at a rate of 0.5 mm/min by use of a tensile testing machine. The bonding strength was calculated by dividing the breakdown load by the bonding area. The rate of cohesion fracture was expressed by the number of fracture of the silicone rubber itself in all the test pieces. The results of the above test are shown in Table 6.

TABLE 6

| Test No. | Surface of porcelain | Glass | Bonding strength (kg/cm$^2$) | Rate of cohesion fracture (%) |
| --- | --- | --- | --- | --- |
| 19 | Unglazed | A | 350 | 100 |
| 20 | surface | B | 420 | 100 |
| 21 | Ground | A | 370 | 100 |
| 22 | surface | B | 400 | 100 |
| 23 | Glazed | A | 150 | 0 |
| 24 | surface | B | 130 | 0 |

Note:
Glazed surface was applied with white glaze which is used in the surface of insulator It is appreciated from the results of the bonding strength test shown in Table 6 that the test pieces having the unglazed surface or the ground surface bonded with the glass had a high bonding strength and no starting point of breakdown in the bonding surfaces while the starting point of breakdown was located in the interior of the glass. On the other hand, the test pieces having the glazed surface had all the starting points of breakdown in the bonding surface so that the bonding strength between the glass and the glaze was low.

EXAMPLE 3

Various kinds of ceramic hollow insulator bodies 1 having a through-hole 2 as shown in FIG. 1 were prepared. The material of the hollow insulator bodies was the same as that used for the support of the disconnector in the substations. The prepared hollow insulator bodies had an outer diameter "D" of 80~145 mm and a through-hole of an inner diameter "d" of 2~60 mm with a ratio of the inner diameter to the outer diameter; (d/D)×10 being 2.8~50%. Each of the opposite ends of the through-hole had a tapered portion 3 of a taper angle of 30° having an opening larger than the through-hole by 10 mm. The tapered portions 3 were provided for the purpose of relieving an internal pressure generated by a change of the circumferential temperature after curing of the silicone rubber. The inner surface of the through-hole was glazed by use of the same glaze as used in the outer surface of the hollow insulator body.

These hollow insulator bodies were provided with optical fibers passed through the through-hole of the hollow insulator bodies and sealed by a silicone rubber to produce optical fiber composite insulators. Thus prepared optical fiber composite insulators were used as test samples. The optical fibers used in these test samples were coated with a primary coat and a shock absorbing layer by considering the airtight property of the optical fiber itself and the handling property of the optical fiber in the sealing process. Moreover, in order to ensure a necessary hermetical bonding property of the surface of the shock absorbing layer which is the most outer layer of the coated portion on the optical fiber, a primer treatment was applied to the surface of the shock absorbing layer by use of a silane coupling agent.

Also, among various silicone rubbers of addition type having a high temperature curing property, a silicone rubber having a high tensile strength and elongation at breakdown was selected as a sealing material. Properties of the shock absorbing layer coated on the optical fiber and the silicone rubber used as the sealing material are shown in Table 7.

TABLE 7

| | Coated portion of optical fiber | Silicone rubber |
| --- | --- | --- |
| Tensile strength (kg/cm$^2$) | 450 | 45 |
| Elongation at breakdown (%) | 47 | 570 |
| Hardness | (Shore hardness D) 54 | (JIS) 34 |
| Material | epoxy series acrylic resin | addition reaction type silicone rubber |

Each test sample had two optical fibers passed through the through-hole in the ceramic hollow insulator body and under a condition that each optical fiber was subjected to a tension of 1 kg, silicone rubber was filled into the clearance between the optical fibers and the inner wall of the through-hole. The silicone rubber was agitated for 30 min in a vacuum at most 1 Torr to remove bubbles and then filled into the clearance under a pressure of 5 kg/cm$^2$. When the silicone rubber was filled under pressure, it was preferable to apply a vacuum to the end of the through-hole opposite the filling end to thereby prevent bubbles from remaining in the adhesion interfaces between the silicone rubber and the optical fibers. The through-hole of the insulator body was filled with the silicone rubber, and then test samples were kept in a thermostatic bath of 80° C. for 6 hours to cure the silicone rubber to thereby finally produce optical fiber composite insulators as test samples.

Thus produced optical fiber composite insulators were investigated by the bending strength test, the thermal resistance critical test and airtight test.

In the bending strength test, ten test samples were prepared. Each test sample was rigidly fixed at one end by the flanged cap and the other free end was loaded in a direction perpendicular to the longitudinal axis of the hollow insulator body. The results of the test are expressed by a value of a mean mechanical strength of ten test samples relative to a mean mechanical strength of a solid insulator having the same outer diameter being 100.

In the thermal resistance critical test, ten test samples were prepared. These test samples were heated to a predetermined temperature at a rate of 30° C./hr and subsequently kept at the temperature for 3 hours and then the appearance of the test samples was observed after cooling. The results of the test are expressed in Table 8 by a symbol ⊙ when any crack did not occur in all the ten test samples, a symbol Δ when cracks apparently occurred, the silicone rubber protruded or the optical transmission factor varied in 1/10 of the test samples and a symbol X when such a detractive change occurred in at least 2/10 of test samples. The above tests were started at a temperature of 90° C. and then undetracted test samples were sequentially tested at 100° C., 110° C. and 120° C.

In the airtight test, ten samples were prepared. Each of the test samples was loaded with an AC withstand voltage corresponding to the external flash over voltage of each insulator. The results of the test are expressed by a symbol X when the test sample is penetrated by current or tracking is found in the interior of the test sample after decomposing in 1/10 of ten test samples.

The results of the above tests are shown in Table 8.

mal resistance of the optical fiber composite insulator was not different from that of the conventional solid insulator at a temperature not higher than 120° C. However, when the ratio (d/D)×100 exceeded 25%, the optical fiber composite insulator was destructed or the silicon rubber was fractured.

Furthermore, when the inner diameter "d" of the through-hole was smaller than 3 mm, the optical fiber composite insulator having the same geometrical insulator was penetrated by the current in the AC withstand voltage test. It was found from investigations of decomposed optical fiber composite insulators which were externally flashed over that the two optical fibers contacted each other or the inner face of the through-hole so that the optical fibers were not sealed by the silicone rubber and resulted in a reduced airtight property.

It is appreciated that the above disadvantages result from a large difference in coefficient of thermal expansion such that the coefficient of thermal expansion of the silicone rubber is 30 times larger than that of the ceramic. That is, in a case of the volume of the silicone rubber larger than a constant volume, an internal pres- TABLE 8 (a)

| (d/D) × 100 (%) | Outer diameter of barrel portion D (mm) | Inner diameter of through-hole d (mm) | Bending strength (relative value) | Thermal resistance critical test (°C.) | | | | Degree of airtightness after sealed | Remarks |
| --- | --- | --- | --- | --- | --- | --- | --- | --- | --- |
| | | | | 90 | 100 | 110 | 120 | | |
| 2.8 | 145 | 4 | 100 | ⊙ | ⊙ | ⊙ | ⊙ | ⊙ | Present |
| 3.2 | 125 | 4 | 100 | ⊙ | ⊙ | ⊙ | ⊙ | ⊙ | invention |
| 4.1 | 145 | 6 | 100 | ⊙ | ⊙ | ⊙ | ⊙ | ⊙ | |
| 4.8 | 80 | 4 | 100 | ⊙ | ⊙ | ⊙ | ⊙ | ⊙ | |
| 5.7 | 105 | 6 | 100 | ⊙ | ⊙ | ⊙ | ⊙ | ⊙ | |
| 6.9 | 145 | 10 | 100 | ⊙ | ⊙ | ⊙ | ⊙ | ⊙ | |
| 7.5 | 80 | 6 | 100 | ⊙ | ⊙ | ⊙ | ⊙ | ⊙ | |
| 9.5 | 105 | 10 | 100 | ⊙ | ⊙ | ⊙ | ⊙ | ⊙ | |
| 10.0 | 80 | 8 | 100 | ⊙ | ⊙ | ⊙ | ⊙ | ⊙ | |
| 12.0 | 125 | 15 | 100 | ⊙ | ⊙ | ⊙ | ⊙ | ⊙ | |
| 13.8 | 145 | 20 | 100 | ⊙ | ⊙ | ⊙ | ⊙ | ⊙ | |
| 16.0 | 125 | 25 | 100 | ⊙ | ⊙ | ⊙ | ⊙ | ⊙ | |
| 17.5 | 80 | 15 | 100 | ⊙ | ⊙ | ⊙ | ⊙ | ⊙ | |
| 19.0 | 105 | 20 | 100 | ⊙ | ⊙ | ⊙ | ⊙ | ⊙ | |
| 20.0 | 125 | 25 | 100 | ⊙ | ⊙ | ⊙ | ⊙ | ⊙ | |
| 22.2 | 90 | 20 | 100 | ⊙ | ⊙ | ⊙ | ⊙ | ⊙ | |
| 25.0 | 80 | 20 | 100 | ⊙ | ⊙ | ⊙ | ⊙ | ⊙ | |

TABLE 8 (b)

| (d/D) × 100 (%) | Outer diameter of barrel portion D (mm) | Inner diameter of through-hole d (mm) | Bending strength (relative value) | Thermal resistance critical test (°C.) | | | | Degree of airtightness after sealed | Remarks |
| --- | --- | --- | --- | --- | --- | --- | --- | --- | --- |
| | | | | 90 | 100 | 110 | 120 | | |
| 27.6 | 145 | 40 | 100 | ⊙ | ⊙ | ⊙ | Δ | ⊙ | Comparative |
| 28.0 | 125 | 35 | 100 | ⊙ | ⊙ | ⊙ | Δ | ⊙ | example |
| 28.6 | 105 | 30 | 100 | ⊙ | ⊙ | ⊙ | Δ | ⊙ | |
| 32.0 | 125 | 40 | 98 | ⊙ | ⊙ | ⊙ | X | ⊙ | |
| 37.5 | 80 | 30 | 92 | ⊙ | ⊙ | Δ | X | ⊙ | |
| 38.1 | 105 | 40 | 94 | ⊙ | ⊙ | X | X | ⊙ | |
| 41.4 | 145 | 60 | 88 | ⊙ | ⊙ | X | X | ⊙ | |
| 44.4 | 90 | 40 | 83 | ⊙ | ⊙ | Δ | X | ⊙ | |
| 48.0 | 125 | 60 | 82 | ⊙ | Δ | X | X | ⊙ | |
| 50.0 | 80 | 40 | 80 | ⊙ | X | X | X | ⊙ | |

It is appreciated from the results in Table 8, that when the ratio (d/D)×100 of the inner diameter (d) of the through-hole to the outer diameter (D) of the hollow insulator body is at most 25%, the optical fiber composite insulator had the same bending strength as that of the conventional solid insulator so that the optical fiber composite insulator was interchangeable with the conventional solid insulator in view of strength.

Moreover, it is appreciated from the results of the thermal resistance critical test shown in Table 8 that when the ratio (d/D)×100 was at most 25%, the thersure is generated by the thermal expansion of the silicone rubber at a high temperature and as a result, the optical fiber composite insulator will be destructed or the silicone rubber will be fractured.

Accordingly, it is seen from the above that when the ratio (d/D) is the particular value, i.e. at most 0.25, and the inner diameter "d" of through-hole is larger than 3 mm, the inherent mechanical strength of the insulator is not decreased and the hermetical bonding property of the optical fiber has no problem.

EXAMPLE 4

A construction of the optical fiber composite insulator according to this example is shown in FIG. 2. Referring to FIG. 2, the optical fiber composite insulator comprised a hollow insulator body 1 and an optical fiber 4. The hollow insulator body had a central through-hole 2 extended therethrough. The central through-hole 2 was provided at the opposite ends with tapered portion 3, respectively. The optical fiber 4 was passed through the through-hole 2 and sealed by a silicone rubber 6 filled in the through-hole 2 and the tapered portions 3. The hollow insulator body 1 was provided at the opposite ends with flanged caps 5, respectively, adapted for vertically stacking a plurality of the hollow insulator bodies. An optical fiber 4 coated with a resin having predetermined properties as shown in FIG. 2 was prepared. The surface of the coated portion was applied with a silane coupling agent and treated by a primer treatment. The optical fiber 4 having the thus treated coated portion was passed through the through-hole 2 of the hollow insulator body 1. Subsequently, a liquid of silicone rubber having necessary material properties was filled into a clearance between the optical fiber and the inner surface of the through-hole 2 via the tapered portion 3. The silicone rubber was cured at a temperature of 60° C. or higher to thereby hermetically seal the optical fiber and the hollow insulator body by use of silicone rubber.

Tests were effected on properties of the resin as coating material to be used for a coated portion on the optical fiber, and on properties of the silicone rubber as a sealing material.

Optical fibers having the coated portion consisting of a primary coat and a shock absorbing layer were selected for the test, considering the airtight property of the optical fiber per se and the handling property of the optical fiber in the sealing process. The kind of resin constituting the coated portion of the optical fiber was selected, taking Young's modulus and elongation at break point, etc., as parameters. A primer was coated on the surface of the coated portion of the optical fiber. The silicone rubber as a sealing material for sealing the coated portion and the insulator bodies was selected, taking curing mechanism, tensile strength after the curing elongation at break point, and hardness, etc., as parameters.

In producing the optical fiber composite insulator of this embodiment, a plurality of optical fibers were passed through a central through-hole in the hollow insulator body in such a manner that they did not contact each other, and then a liquid silicone rubber was filled into a clearance between the optical fiber and the inner surface of the through-hole and between the optical fibers. The curing mechanism of the silicone rubber is usually classified as condensation type and addition type. Silicone rubbers of condensation type crosslink and cure by condensation reactions, and form side products of the reactions. Silicone rubbers of addition type crosslink and cure by addition reactions of unsaturated groups and siloxane containing Si-H.

Properties of the coated portion airtightly adhered to the outer surface of the optical fibers are shown in the following Table 9. Properties of the silicone rubbers used for the sealing are shown in the succeeding Table 10.

TABLE 9

| Coated portion of optical fiber | Young's modulus $(kg/mm^2)$ | Tensile strength $(kg/cm^2)$ | Elongation at breakdown (%) | Hardness (Shore) | Remarks |
| --- | --- | --- | --- | --- | --- |
| A | 40 | 400 | 42 | D 55 | Epoxy series acrylate |
| B | 10 | 300 | 60 | D 65 | Urethane series acrylate |
| C | 42 | 450 | 60 | D 68 | " |
| D | 60 | 420 | 40 | D 70 | " |
| E | 0.1 | 15 | 100 | A 40 | Silicone series acrylate |
| F | 0.17 | 11 | 150 | A 15 | " |
| G | 0.30 | 50 | 60 | A 60 | " |
| H | 8.5 | 100 | 80 | A 80 | " |

Note:
Measurements of Young's modulus and elongation at break point are carried out according to JIS K-7113 by using No. 2 Dunbell. The hardness is conducted according to JIS K-7215, shore hardness A and D.

TABLE 10

| Silicone rubber | Curing | Viscosity (P/25° C.) | Hardness (JIS) | Tensile strength $(kg/cm^2)$ | Elongation at break point (%) |
| --- | --- | --- | --- | --- | --- |
| a | Addition type | 50 | 38 | 15 | 150 |
| b | " | 300 | 80 | 17 | 200 |
| c | " | 45 | 70 | 40 | 80 |
| d | " | 700 | 80 | 50 | 500 |
| e | " | 1,000 | 30 | 30 | 300 |
| f | Condensation type | 60 | 40 | 15 | 150 |
| g | Addition type | 1.200 | 40 | 45 | 300 |
| h | " | 1,200 | 35 | 35 | 300 |
| i | " | 350 | 25 | 48 | 550 |
| j | " | 280 | 20 | 48 | 580 |
| k | " | 220 | 15 | 48 | 600 |
| l | " | 190 | 12 | 47 | 630 |
| m | " | 100 | 8 | 45 | 700 |
| n | " | 480 | 32 | 38 | 390 |
| o | " | 250 | 35 | 30 | 280 |
| p | Condensation type | 450 | 30 | 43 | 400 |

Note:
Measurements of tensile strength, elongation at break point and hardness are carried out according to JIS K-6301. The hardness test is conducted according to spring hardness test type A.

By combining these selected materials, ten test samples each having optical fibers sealed in a ceramic hollow insulator body of a length of 200 mm, an inner diameter of 10 mm, and an outer diameter of 20 mm were prepared for each of the test levels and used in deterioration tests wherein temperature and humidity conditions in natural environment were accelerated. Geometrical configuration and constituting materials of the test samples are shown in FIG. 3, and an enlarged cross-sectional view of the optical fiber is shown in FIG. 4.

In the deterioration tests, thermal shock was repeatedly exerted on the test samples for the cycles as shown in Table 11. In each cycle, the test sample was immersed in a hot water tank of 80° C. and then immersed in a nonfreezing liquid tank of −20° C. for 30 minutes, respectively. The sealing state of the test samples after the thermal shock was evaluated. The results of the deterioration test for the combinations of the selected materials are shown in the following Table 11.

Evaluation items in Table 11 for evaluating totally the combinations of the selected materials are: a light translucent test of the optical fibers for ascertaining severance or nonseverance of the optical fibers; bonding property of an interface between the silicone rubber and the coated portion of the optical fibers; and AC withstand voltage test for ascertaining the adhesivity of an interface between the silicone rubber and the ceramics hollow insulator body.

The results of the evaluation after the thermal shock test are expressed by a symbol ⊙ when all ten test samples had a good translucent property and voltage withstanding property, a symbol Δ when 1/10~3/10 of the ten test samples were destructed such that the optical fiber was non-translucent or the test sample was penetrated by the current in the withstand voltage test, and by a symbol X when 4/10 or more of the ten test samples were destructed owing to a non-translucency of the optical fibers or penetration of the current.

TABLE 11(a)

| Coated portion of optical fibers | Silicone rubber | 500 cycles | 1,500 cycles | 4,000 cycles | Total evaluation |
|---|---|---|---|---|---|
| Present invention A | a | | Δ | X | |
| | c | | X | — | Δ |
| | d | | | | ⊙ |
| | e | | | | ⊙ |
| | f | | X | — | Δ |
| | g | | | | ⊙ |
| | h | | | | ⊙ |
| | i | | | | ⊙ |
| | j | | | | ⊙ |
| | k | | | | ⊙ |
| | l | | | | ⊙ |
| | m | | | | ⊙ |
| | n | | | | ⊙ |
| | p | | X | — | Δ |
| B | a | | Δ | X | |
| | b | | Δ | X | |
| | i | | | | ⊙ |
| | j | | | | ⊙ |
| | k | | | | ⊙ |
| C | b | | Δ | X | |
| | c | | X | — | Δ |
| | f | | X | — | Δ |
| | h | | | | ⊙ |
| | o | | | X | |
| | p | | X | — | Δ |
| D | d | | | | ⊙ |
| | e | | | | ⊙ |
| | k | | | | ⊙ |

TABLE 11(b)

| Coated portion of optical fibers | Silicone rubber | 500 cycles | 1,500 cycles | 4,000 cycles | Total evaluation |
|---|---|---|---|---|---|
| Reference example E | a | X | — | — | X |
| | b | X | — | — | X |
| | c | X | — | — | X |
| | e | X | — | — | X |
| | f | X | — | — | X |
| | h | X | — | — | X |
| | j | Δ | X | — | X |
| | l | Δ | — | — | X |
| | m | Δ | — | — | X |
| | o | X | — | — | X |
| F | a | X | — | — | X |
| | d | Δ | X | — | X |
| G | b | X | — | — | X |
| | c | X | — | — | X |
| | f | X | — | — | X |
| | i | Δ | X | — | X |
| | k | Δ | X | — | X |
| H | d | Δ | X | — | X |
| | e | Δ | X | — | X |
| | f | X | — | — | X |
| | j | Δ | X | — | X |
| | k | Δ | X | — | X |
| | l | Δ | — | — | X |
| | n | Δ | X | — | X |

As seen from Table 11, all of the test samples wherein the material A, B, C or D having large Young's modulus and tensile strength as a material of the coated portion of the optical fiber were sealed by the silicone rubber exhibited satisfactory results enduring well the thermal shocks of 500 cycles.

Among the test samples wherein the material A, B, C or D was used as the material of the coated portion of the optical fiber, those test samples sealed to the ceramic hollow insulator body by the condensation type silicone rubber f or p showed deterioration at thermal shocks of 1,500 cycles or more, though they endured or withstood thermal shocks of 500 cycles. The form of the destruction is destruction of insulation at the sealing interface between the ceramic hollow insulator body and the silicone rubber.

This is considered due to insufficient exhibition of strength at the sealing interface caused by slow development of the curing of the condensation type silicone rubber into the interior thereof and formation of unstable side products in the interior thereof, at the time when the silicone rubber filled in the elongated and narrow clearance in the through-hole of the ceramic hollow insulator body is cured.

Meanwhile, among the test samples wherein the material A, B, C or D is used as the coating material of the coated portion of the optical fiber, those test samples sealed to the ceramic pipe by the addition type silicone rubber a, b, c, p or o showed deterioration partly or wholly at thermal shocks of 1,500 cycles or more, though they did not show deterioration at thermal shocks of 500 cycles.

Destruction styles of those test samples in these cases are mostly severing of the optical fiber or protrusion of the silicone rubber from the sealed end portion.

When comparing the thermal expansion coefficient of the ceramic hollow insulator body with that of the silicone rubber, the latter is higher than the former by about 30 times. Considering a residual stress generated at the time of sealing and a thermal stress generated at the time of thermal shock test, the destruction of the sealing interface of the silicone rubber on the coated portion of the optical fiber or the severing of the optical fiber is caused by breakage of the silicone rubber due to tensile stress produced by thermal expansion of the silicone rubber at elevated temperature.

Among the test samples wherein the material A, B, C or D was used as the material of the coated portion of the optical fiber, those test samples sealed to the ceramic hollow insulator body by the addition type silicone rubber d, e, g, h, i, j, i, k, l, m or n maintained the initial translucent and airtight sealing properties, even after thermal shocks of 4,000 cycles.

Meanwhile, the test samples wherein the material E, F, G or H having a low Young's modulus and a low tensile st used as the material of the coated portion of the optical fiber showed deterioration of a portion or the entire test samples by thermal shocks of 500 cycles.

Destruction style of the test samples in these cases are found to be a crack or cracks emanating from the coated portion and ending at the silicone rubber, which crack or cracks caused destruction of insulation of the test samples.

These results show that fundamentally the use of the materials having a large Young's modulus and a large tensile strength as the material of the coated portion of the optical fiber is preferable, particularly, the use of the silicone rubbers having a large tensile strength and a large elongation at breakdown is more preferable for the sealing of the optical fiber and the ceramic hollow insulator body, because the silicone rubbers per se have high elasticity and high durability to thermal expansion and shrinkage due to temperature change.

EXAMPLE 5

Next, curing conditions of the silicone rubber are studied.

Test samples same as those of Example 4 were used for studying curing temperature and time of the sealing silicone rubber, and deterioration of test samples by thermal shock. Methods of the test and the evaluation are the same as those of Example 4. The results of the deterioration test are shown in the following Table 12.

TABLE 12

| Silicone rubber | Coated portion of optical fiber | Curing condition Temperature (°C.) | Time (Hr) | Result of evaluation after thermal shock test | | | Total evaluation |
|---|---|---|---|---|---|---|---|
| | | | | 500 Cycles | 1,500 Cycles | 4,000 Cycles | |
| i | A | 40 | 10 | X | | | X |
| | | 60 | 4 | | | △ | △ |
| | | 70 | 3 | | | | ⊚ |
| | | 80 | 2 | | | | ⊚ |
| | | 100 | 1 | | | | ⊚ |
| | | 150 | 0.5 | | | | ⊚ |

The addition type high temperature curing silicone rubbers have inverse proportional relationships between the curing temperatures and the curing time, and thus harden more rapidly with the increase of temperature.

In this example, the combination of the silicone rubber i and the material A of the coated portion of the optical fiber, which in Example 4 gave excellent results by maintaining initial properties of the optical fiber even after the deterioration test, was used to study the curing conditions and the deteriorations of the optical fibers after thermal shocks. As a result, the translucent property of the optical fibers after the thermal shock of the same condition with that of Example 4 and the voltage withstanding capability of the test samples are ascertained as good, if the curing temperature is at least 60° C.

Usually, a sealed body having materials of different thermal expansion coefficients produces a residual stress therein by a temperature difference between the temperature at the time of sealing and at the time of after cooled to room temperature. Considering a thermal stress for a long period, a sealing condition of small residual stress is preferable. From that viewpoint, a sealing at low temperatures is considered desirable.

Nevertheless, in the present invention the silicone rubber and the coated portion of the optical fiber had extremely large thermal expansion coefficients than those of the ceramic pipe and the optical fiber, so that the residual stress in the silicone rubber rather acts as a tensile stress.

As a result of an X-ray fluoroscopy, it was ascertained that the stress was mitigated by formation of minute independent bubbles in the silicone rubber, when the curing temperature was high. Independent bubbles generated at the high temperature curing were extinguished to absorb thermal expansion of the silicone rubber, when the test sample was exposed to high temperatures in the deterioration test.

Meanwhile, the independent foams were not produced, when the curing temperature was low, such as 40° C. Therefore, test samples not having the independent bubbles can not absorb thermal expansion of the silicone rubber at elevated temperature, so that peeling off of the sealing silicone rubber from the coated portion of the optical fiber at the sealing interface is liable to occur.

EXAMPLE 6

Next, the effect of the primer treated on the surface of the coated portion of the optical fiber is studied.

Deterioration of the optical fibers by thermal shock is studied, making or without making a primer treatment of applying a primer, such as a silane coupling agent etc., on the surface of the coated portion of the optical fiber using the same materials as those of Example 4. Testing methods and evaluation method are the same as those of Example 4. The results of the thermal shock are shown in the following Table 13.

TABLE 13

| Silicone rubber | Coated portion of optical fiber | Primer treatment | Result of evaluation after thermal shock test | | | Total evaluation |
|---|---|---|---|---|---|---|
| | | | 500 Cycles | 1,500 Cycles | 4,000 Cycles | |
| i | A | effected | | | | ⊙ |
| | | non | | △ | X | X |
| | D | effected | | | | ⊙ |
| | | non | | X | — | X |

In this example, the combinations of the silicone rubber i and the material A or D of the coated portion of the optical fiber, which in Example 4 gave excellent results by maintaining the initial properties of the optical fiber even after the thermal shocks, were used to study the effect of the primer treatment of the coated portion of the optical fiber on the deterioration property after thermal shocks.

As a result, destruction of insulation of the optical fiber caused by peeling off of the sealing silicone rubber from the coated portion of the optical fiber at the sealing interface occurred at the time of a withstand voltage test after thermal shocks, if the coated portion consisting of the material A or D of the optical fiber was not treated by the primer. Thus, it is ascertained that the primer treatment of the coated portion of the optical fiber is preferable, in order to more stably maintain the sealing state of the silicone rubber on the coated portion of the optical fiber.

The structures of the composite insulator and the number of the optical fibers can be varied, so far as the desired cladding portion and the sealing material are used.

Although the present invention has been explained with reference to specific values and embodiments, it will be of course apparent to those skilled in the art that various variations and modifications are possible without departing from the broad spirit and aspect of the present invention as defined in the appended claims.

What is claimed is:

1. An optical fiber composite insulator comprising an hollow insulator body having an axial through-hole and at least one optical fiber extending through the through-hole, said optical fiber being hermetically sealed with a sealing material to an inner surface of said insulator body defining the through-hole, wherein said sealing material is an organic sealing material and the inner surface of said insulator body is a glazed surface formed by application of a glaze which is subsequently fired.

2. An optical fiber composite insulator comprising an hollow insulator body having an axial through-hole and at least one optical fiber extending through the through-hole, said optical fiber being hermetically sealed with a sealing material to an inner surface of said insulator body defining the through-hole, wherein a ratio d/D of an inner diameter "d" of the through-hole to an outer diameter "D" of said insulator body is at most 0.25.

3. The optical fiber composite insulator of claim 2, wherein said inner diameter is at least 3 mm.

4. An optical fiber composite insulator comprising an hollow insulator body having an axial through-hole and at least one coated optical fiber extending through the through-hole, said optical fiber being hermetically sealed to an inner surface of said insulator body defining the through-hole, wherein a coated portion of said optical fiber is hermetically sealed with an organic sealing material to the inner surface of said insulator body defining the through-hole, the coated portion of said optical fiber including a buffer layer comprising a resin having a Young's modulus of at least 10 kg/mm$^2$ and a tensile strength of at least 300 kg/cm$^2$.

5. The optical fiber composite insulator of claim 4, wherein said organic sealing material consists of silicone rubber having an elongation at breakdown of at least 300% and a tensile strength of at least 30 kg/cm$^2$.

6. A method of producing an optical fiber composite insulator, comprising the steps of:

coating a portion of an optical fiber with a resin having a Young's modulus of at least 10 kg/mm$^2$ and a tensile strength of at least 300 kg/cm$^2$;

primer treating said coated portion of said optical fiber;

passing said optical fiber through a through-hole formed in an hollow insulator body; and hermetically sealing said optical fiber with an organic sealing material to an inner surface of said insulator body defining the through-hole.

7. The method of claim 6, wherein silicone rubber is filled in a clearance between said coated portion of said optical fiber and the inner surface of said insulation body defining the through-hole, and is cured at a temperature of not less than 60° C. for hermetically sealing said optical fiber to the inner surface of said insulator body.

* * * * *